US008817467B2

(12) United States Patent
Ore Yang et al.

(10) Patent No.: US 8,817,467 B2
(45) Date of Patent: Aug. 26, 2014

(54) SLIDING PROTECTIVE DEVICE FOR AN ELECTRONIC PRODUCT

(76) Inventors: Yia-Yuan Ore Yang, Taipei (TW); Ko-An Chen, Taipei (TW)

( * ) Notice: Subject to any disclaimer, the term of this patent is extended or adjusted under 35 U.S.C. 154(b) by 198 days.

(21) Appl. No.: 13/484,294

(22) Filed: May 31, 2012

(65) Prior Publication Data
US 2013/0321987 A1    Dec. 5, 2013

(51) Int. Cl.
*G06F 1/16* (2006.01)
*H04M 1/00* (2006.01)

(52) U.S. Cl.
USPC .................................. 361/679.55; 455/575.8

(58) Field of Classification Search
CPC .......................... H04M 1/0214; H04M 1/3888
USPC ........... 361/679.3, 679.55, 679.56; 455/575.8
See application file for complete search history.

(56) References Cited

U.S. PATENT DOCUMENTS

| | | | | |
|---|---|---|---|---|
| 6,016,176 | A * | 1/2000 | Kim et al. | 349/84 |
| 6,377,324 | B1 * | 4/2002 | Katsura | 349/58 |
| 6,577,496 | B1 * | 6/2003 | Gioscia et al. | 361/679.3 |
| 7,466,961 | B1 * | 12/2008 | Gioscia et al. | 455/73 |
| 2006/0146488 | A1 * | 7/2006 | Kimmel | 361/681 |
| 2007/0152633 | A1 * | 7/2007 | Lee | 320/114 |
| 2007/0247793 | A1 * | 10/2007 | Carnevali | 361/681 |
| 2008/0096620 | A1 * | 4/2008 | Lee et al. | 455/575.8 |
| 2008/0158795 | A1 * | 7/2008 | Aoki et al. | 361/681 |
| 2009/0104949 | A1 * | 4/2009 | Sato et al. | 455/575.3 |
| 2010/0016038 | A1 * | 1/2010 | Demuynck et al. | 455/575.3 |
| 2010/0048268 | A1 * | 2/2010 | O'Neill et al. | 455/575.8 |
| 2011/0188176 | A1 * | 8/2011 | Kim | 361/679.01 |
| 2011/0273823 | A1 * | 11/2011 | Lamers et al. | 361/679.01 |
| 2012/0002360 | A1 * | 1/2012 | Seo et al. | 361/679.01 |
| 2012/0039021 | A1 * | 2/2012 | Karwan | 361/679.01 |
| 2012/0268880 | A1 * | 10/2012 | Tomita et al. | 361/679.09 |
| 2013/0010405 | A1 * | 1/2013 | Rothkopf et al. | 361/679.01 |

* cited by examiner

*Primary Examiner* — Adrian S Wilson
(74) *Attorney, Agent, or Firm* — Leong C. Lei

(57) ABSTRACT

A sliding protective device for an electronic product having a first portion and a second portion is disclosed. The protective device comprises a top cover, a bottom cover, a fixing element, and a sliding element, wherein the fixing element is provided at an inner surface of one of the aforementioned covers to be fixed to the first portion of the electronic product; the sliding element is provided at an inner surface of the other one of the aforementioned covers to be slidably engaged with two lateral sides of the second portion of the electronic product; whereby, when the electronic product is being opened, the second portion of the electronic product can slide along the sliding element, so that the protective device can be always smoothly attached to the outer surfaces of the electronic product, so that the protective device can be prevented from being bulged or wrinkled.

8 Claims, 4 Drawing Sheets

SLIDING PROTECTIVE DEVICE FOR AN ELECTRONIC PRODUCT

TECHNICAL FIELD OF THE INVENTION

The present invention relates to a sliding protective device for an electronic product having a first portion and a second portion pivotally connected to the first portion, whereby the protective device can be always smoothly attached to the outer surfaces of the electronic product, so that the protective device can be prevented from being bulged or wrinkled, and the electronic product can be protected from being damaged or scratched.

DESCRIPTION OF THE PRIOR ART

With the mature development of electronic technology and network technology various kinds of electronic products have been widely used. To facilitate an electronic product to be carried, a slim and light design is preferred. As a result, the internal components of a slim electronic product would be delicate. For protecting the electronic product of the type from being damage, a protective cover or housing was developed, with which the shock resistance of the electronic product can be increased.

For an electronic product capable of being pivotally opened or closed, such as a notebook computer, the protective device is usually designed in the form of a storage bag, which can be made by using leather, shock-absorbing foam rubber, and the like. A closed electronic product can be placed into the protective bag, so that it can be protected from being damaged when it is collided or scratched by other objects.

In view of the above protective bag, although it can protect the electronic product from being damaged, it is inconvenient in use, as the electronic product should be closed before being placed into the protective bag, and the electronic product should be taken out of the protective bag when it is required to be used. Besides, the protective bag is liable to get lost, when it is separated from the electronic product.

To overcome the disadvantages of the above protective bag, there is another protective device being developed, which employs a flat sheet having engagement elements at four corner thereof, wherein the flat sheet can be made of plastics, shock-absorbing foam rubber, or the like. The engagement elements can be respectively engaged with two corners of the screen frame of the electronic product and two corners of the base frame of the electronic product, so that the flat sheet can be attached to the electronic product, no matter the electronic product is swung open or closed. However, the protective device of this type will form a bulging portion or wrinkles near to the pivotal portion between the screen frame and the base frame of the electronic product, which may result a break of the protective device after a period of use.

In view of the disadvantages of the existing protective devices for electronic products, there is need for improvement.

SUMMARY OF THE INVENTION

The primary object of the present invention is to provide a sliding protective device for an electronic product having a first portion and a second portion pivotally connected to the first portion, the sliding protective device comprising a top cover, a bottom cover, at least one fixing element, and at least one sliding element, wherein the fixing element is provided at an inner surface of one of the aforementioned covers to be fixed to the first portion of the electronic product; the sliding element is provided at an inner surface of the other one of the aforementioned covers to be slidably engaged with two lateral sides of the second portion of the electronic product; whereby, when the electronic product is closed, the first portion and the second portion of the electronic product can be fully covered by the bottom cover and the top cover of the protective device, so that the electronic product can be protected properly; when the electronic product is being opened, the second portion of the electronic product can slide along the sliding element, so that the bottom cover and the top cover can be always smoothly attached to the outer surfaces of the first portion and the second portion of the electronic product, so that the bottom cover and the top cover can be prevented from being bulged or wrinkled, and the electronic product can be protected properly.

Other objects, advantages, and novel features of the present invention will become more apparent from the following detailed description when taken in conjunction with the accompanying drawings.

DETAILED DESCRIPTION OF THE PREFERRED EMBODIMENTS

To allow the features, advantages and effects of the present invention to be understood more easily, one embodiment according to the present invention will be detailed below with reference to the accompanying drawings. The embodiment is used for illustrating various perspectives of the present invention, but not for limiting the scope of the present invention.

Figure 1:
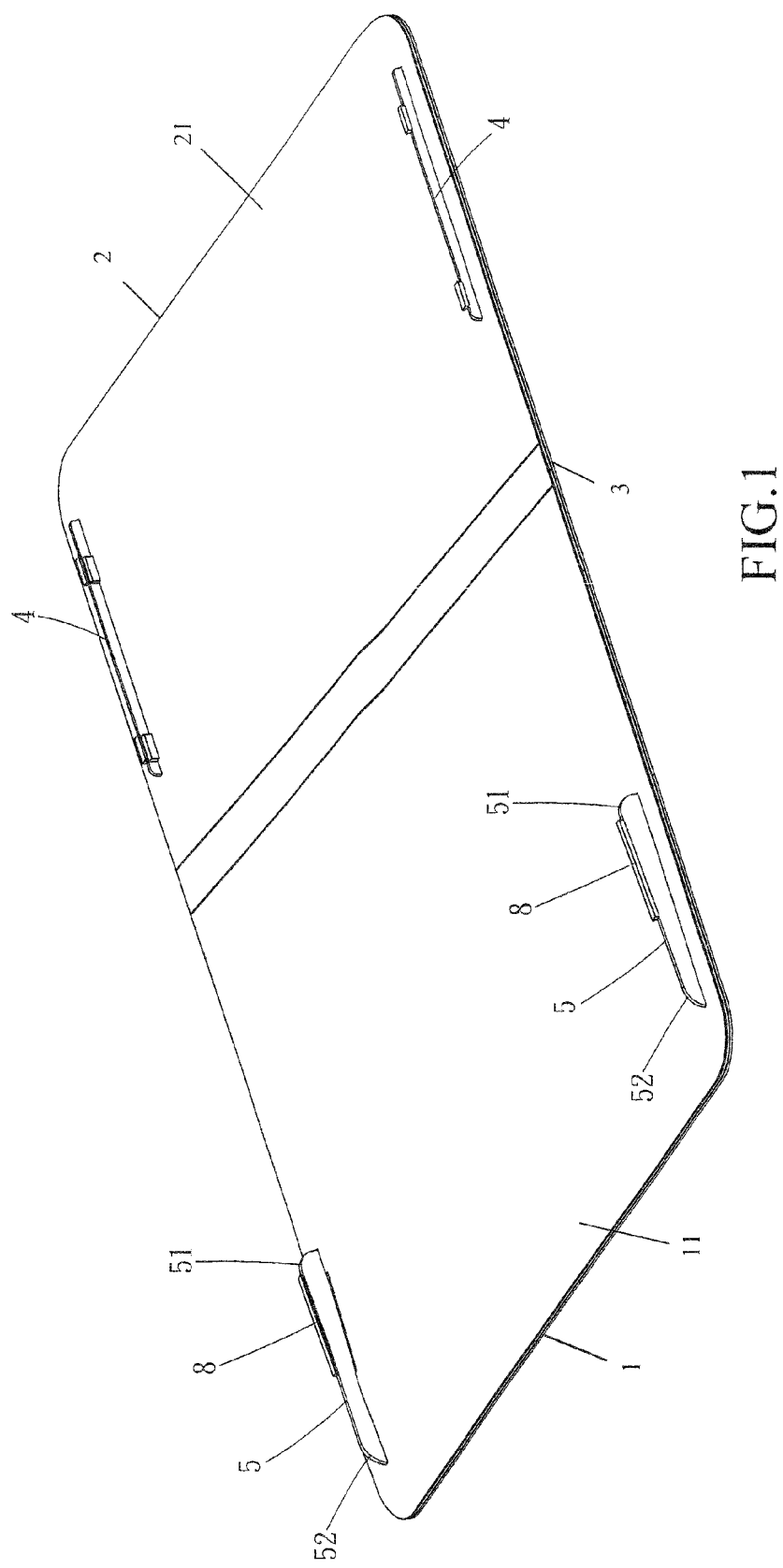
FIG. 1 shows an unfolded view of one embodiment of the present invention.
Figure 2:
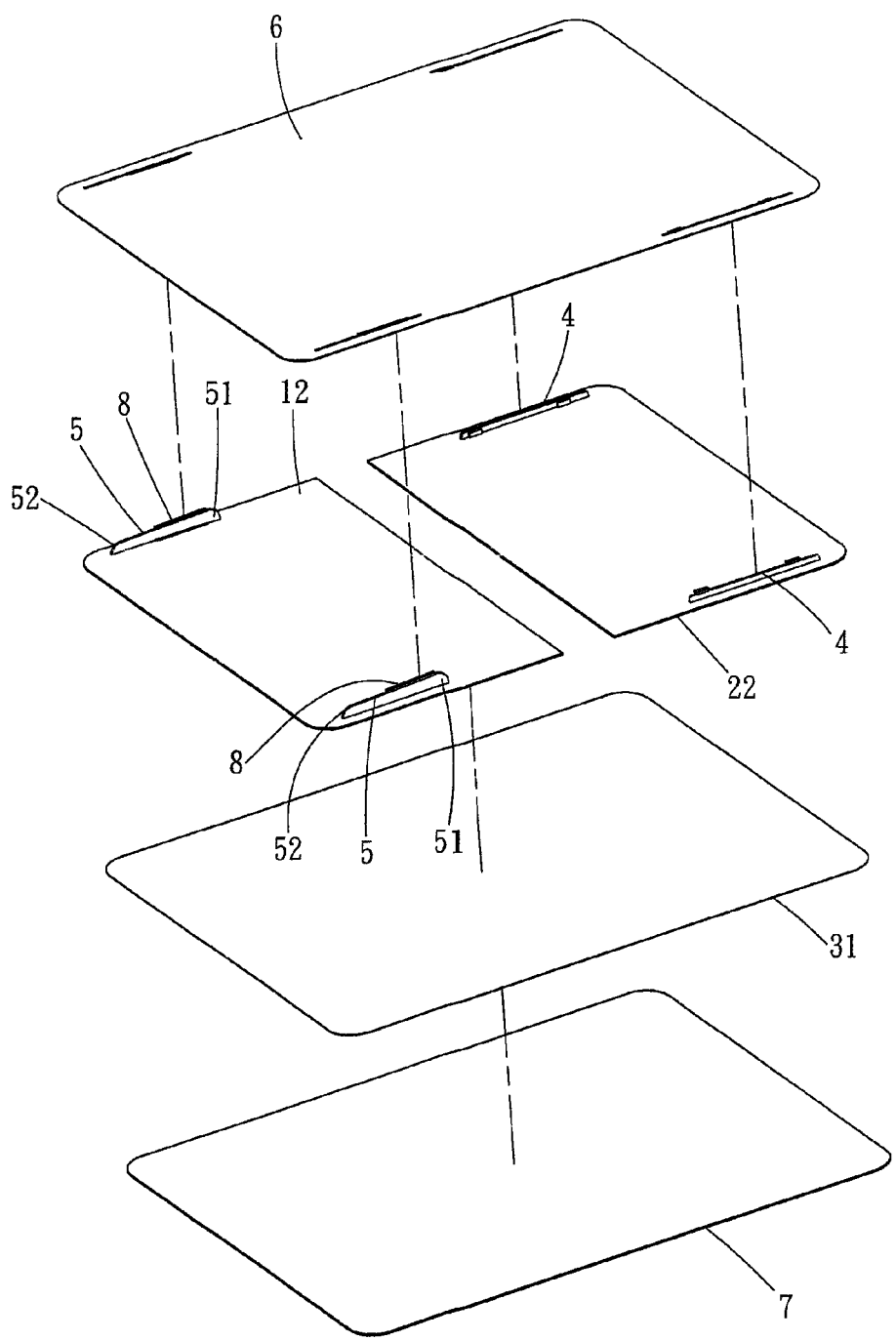
FIG. 2 shows an exploded view of the embodiment of the present invention.

As shown in FIGS. 1 and 2, a sliding protective device according to one embodiment of the present invention is disclosed. The sliding protective device is used for an electronic product that includes a first portion and a second portion pivotally connected to the first portion. As an example, the electronic product can be a notebook computer, wherein the first portion can be referred to the base frame thereof, and the second portion can be referred to the screen frame thereof. The sliding protective device can be attached to the outer surfaces of the electronic product. As shown, the sliding protective device generally comprises a top cover 1, a bottom cover 2, and a joining portion 3, two fixing elements 4, and two sliding elements 5.

The top cover 1 has an inner surface 11, and the bottom cover 2 has an inner surface 21.

The fixing elements 4 can be provided at the inner surface 11 of the top cover 1 or the inner surface 21 of the bottom cover 2. In this embodiment, the fixing elements 4 are provided at the inner surface 21 of the bottom cover 2. The fixing elements 4 are arranged in parallel and can be fixed to the first portion of the electronic product. Furthermore, the fixing elements 4 can be made in the form of a clip, a hook-and-loop fastener, a magnet, or an adhesive piece.

The sliding elements 5 can be provided at the inner surface 11 of the top cover 1 or the inner surface 21 of the bottom cover 2. In this embodiment, the sliding elements 5 are provided at the inner surface 11 of the top cover 1. The sliding elements 5 are arranged in parallel and can be slidably engaged with two lateral sides of the second portion of the electronic product, so that the second portion of the electronic product can slide along the sliding elements 5. Furthermore, each of the sliding elements 5 has a first end 51 and a second end 52, wherein the first end 51 is proximal to the joining portion 3, and the second end 52 is distal to the joining portion 3. The first end 51 has a height greater than the second end 52.

In more detail, as shown in FIG. 2, the top cover 1 may include a first inner board 12, and the bottom cover 2 may include a second inner board 22, wherein the first inner board 12 and the second inner board 22 are attached to a third inner board 31, so that the first inner board 12 and the second board 22 are joined together by the third inner board 31, and can be folded relative to the middle portion of the third inner board 31. The joined board and the associated elements 4, 5 are disposed between a top layer 6 and a bottom layer 7, wherein the top layer 6 defines a number of slits corresponding to the elements 4, 5 for allowing the elements 4,5 to be inserted through. Furthermore, the first inner board 12 can be integrally formed with the sliding elements 5, and the second inner board 22 can be integrally formed with the fixing elements 4.

Furthermore, the protective device of the present invention may include a blocking plate 8 for each of the sliding elements 5, wherein the blocking plate 8 is provided at one end of one of the sliding elements 5 to limit the sliding range of the second portion of the electronic product.

Figure 3:
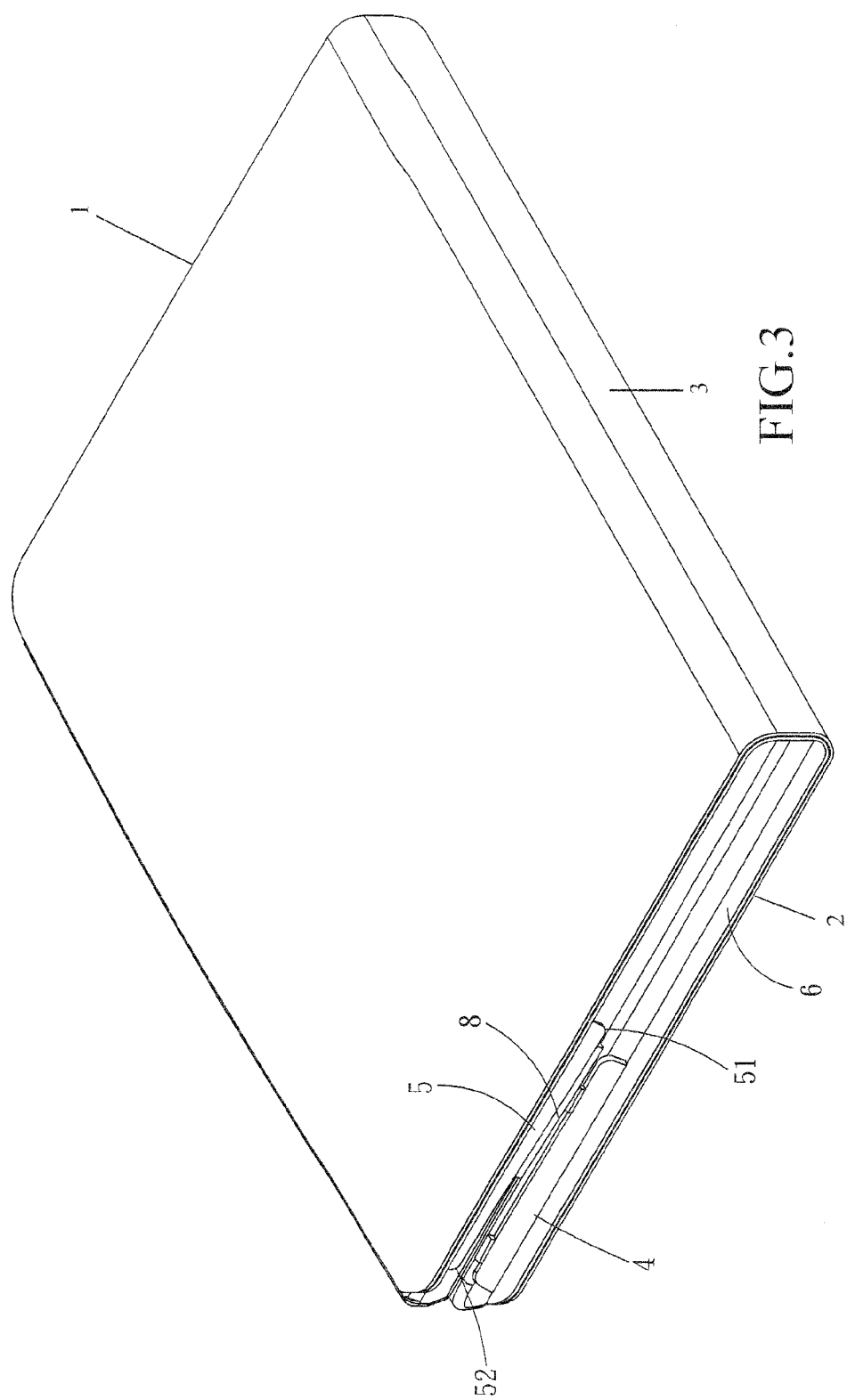
FIG. 3 shows an application view of the embodiment, wherein the electronic product is in a closed state.
Figure 4:
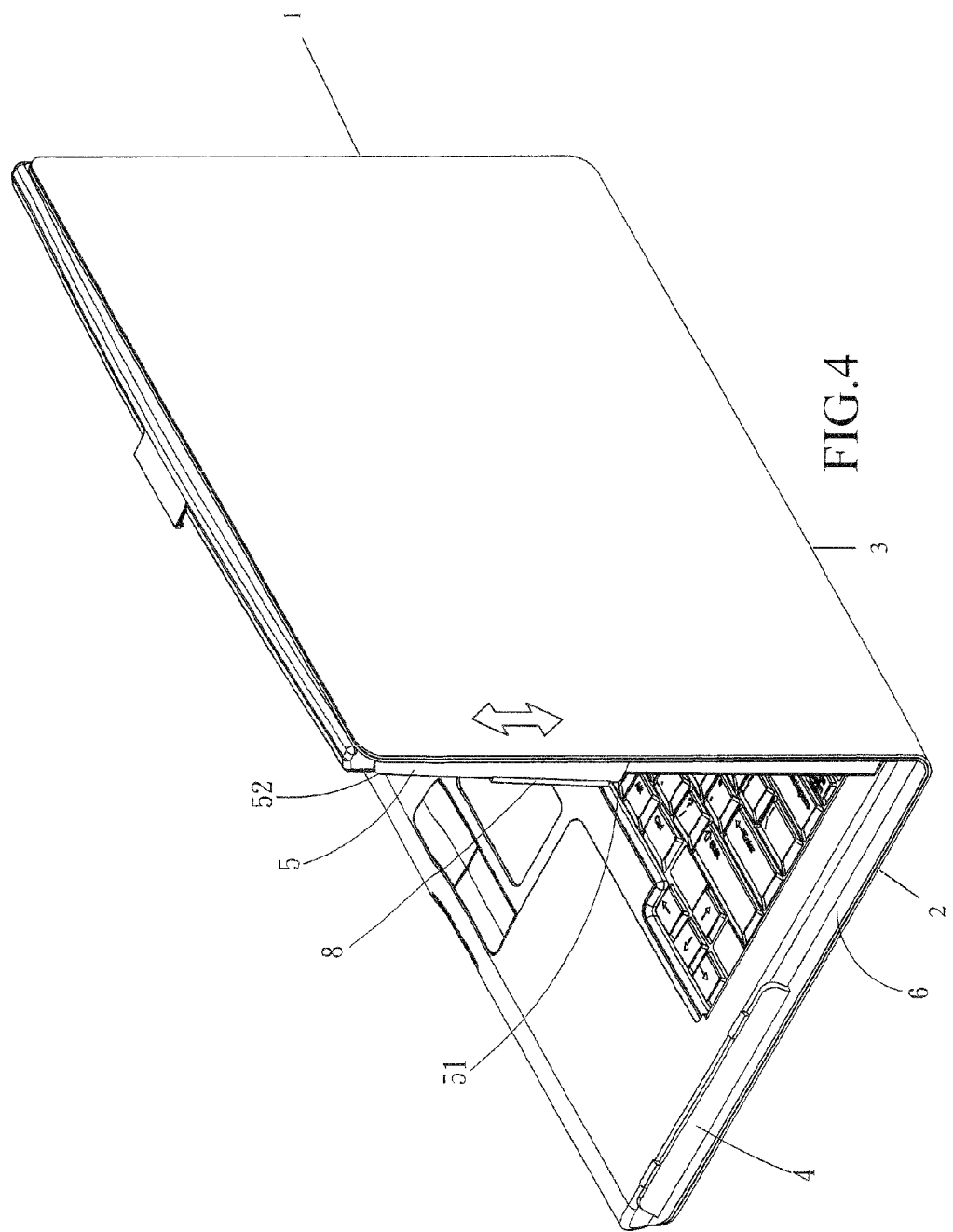
FIG. 4 shows an application view of the embodiment, wherein the electronic product is in an opened state.

As shown in FIGS. 3 and 4, wherein the protective device of the present invention is applied to a notebook computer which has a first portion and a second portion, wherein the first portion is referred to the base frame of the notebook computer, and the second portion is referred to the screen frame of the notebook computer. As shown, the fixing elements 4 are fixed to the first portion (i.e., the base frame) of the notebook computer, and the sliding elements 5 are slidably engaged with two lateral sides of the second portion (i.e., the screen frame) of the notebook computer, so that the bottom cover 2 and the top cover 1 can be respectively attached to the outer surfaces of the first portion and the second portion of the notebook computer, so that the shock resistance of the notebook computer can be increased and the notebook computer can be protected from being damaged or scratched. When the notebook computer is closed, the first portion and the second portion of the notebook computer can be fully covered by the bottom cover 2 and the top cover 1 of the protective device, so that the electronic product can be protected properly. When the notebook computer is being opened, the second portion of the notebook computer can slide along the sliding elements 5, so that the bottom cover 2 and the bottom cover 1 can be always smoothly attached to the outer surfaces of the first portion and the second portion of the notebook computer, so that the bottom cover 2 and the top cover 1 can be prevented from being bulged or wrinkled, and the electronic product can be protected properly.

In light of the foregoing, the present invention employs the fixing elements 4 provided at the bottom cover 2 to be fixed to the first portion of the electronic product, and the sliding elements 5 provided at the top cover 1 to be slidably engaged with the two lateral sides of the second portion of the electronic product, so that the bottom cover 2 and the top cover 1 can be always smoothly attached to the outer surfaces of the first portion and the second portion of the electronic product, so that the shock resistance of the electronic produce can be increased, and the electronic product can be protected from being damaged or scratched.

Although the present invention has been described with a certain degree of particularity, it is understood that the present disclosure is made by way of example only and the combination and arrangement of parts may be resorted to without departing from the spirit and scope of the invention hereinafter claimed.

We claim:

1. A sliding protective device for an electronic product having a first portion and a second portion pivotally connected to the first portion, comprising:
    a top cover;
    a bottom cover;
    at least one fixing element provided at an inner surface of one of said covers to be fixed to the first portion of the electronic product;
    at least one sliding element provided at an inner surface of the other one of said covers, so that the second portion of the electronic product can slide along said sliding element; and
    a joining portion, which joins said top cover and said bottom cover together and allows said top cover to be folded relative to said bottom cover;
    wherein said top cover includes a first inner board, and said bottom cover includes a second inner board, wherein said first inner board and said second inner board are attached to a third inner board, so that said first inner board and said second inner board are joined together by said third inner board to form a foldable body, which is disposed between a top layer and a bottom layer.

2. The sliding protective device of claim 1, wherein said first inner board is integrally formed with said fixing element or said sliding element.

3. The sliding protective device of claim 1, wherein said second inner board is integrally formed with said fixing element or said sliding element.

4. The sliding protective device of claim 1, wherein said fixing element is selected from the group consisting of a clip, a hook-and-loop fastener, a magnet, and an adhesive piece.

5. The sliding protective device of claim 1, wherein the number of said fixing element is more than one, and the fixing members are arranged in parallel at an inner surface of one of said covers.

6. The sliding protective device of claim 1, wherein the number of said sliding element is more than one, and the sliding members are arranged in parallel at an inner surface of the other one of said covers.

7. The sliding protective device of claim 1, wherein said sliding element has a first end and a second end, the first end being proximal to a joining portion between said top cover and said bottom cover, and the second end being distal to the joining portion, the first end having a height greater than the second end.

8. The sliding protective device of claim 1, further comprising a blocking plate provided at one end of said sliding element to limit the sliding range of the second portion of the electronic product.

* * * * *